United States Patent
Huang et al.

(10) Patent No.: US 7,779,124 B2
(45) Date of Patent: Aug. 17, 2010

(54) ACTIVE MONITORING SYSTEM AND METHOD THEREOF

(75) Inventors: Tsung Chi Huang, Taipei (TW); Chi Jen Lin, Taipei (TW); Kuan Wei Cheng, Taipei (TW)

(73) Assignee: Moxa Inc., Taipei (TW)

( * ) Notice: Subject to any disclaimer, the term of this patent is extended or adjusted under 35 U.S.C. 154(b) by 115 days.

(21) Appl. No.: 12/318,062

(22) Filed: Dec. 22, 2008

(65) Prior Publication Data
US 2010/0161703 A1   Jun. 24, 2010

(51) Int. Cl.
*G06F 15/173* (2006.01)

(52) U.S. Cl. ...................................... 709/224

(58) Field of Classification Search ............... 709/224
See application file for complete search history.

(56) References Cited

U.S. PATENT DOCUMENTS

| | | | |
|---|---|---|---|
| 6,757,714 B1 * | 6/2004 | Hansen | 709/206 |
| 7,003,558 B2 * | 2/2006 | Agrusa et al. | 709/223 |
| 7,117,239 B1 * | 10/2006 | Hansen | 709/200 |
| 7,146,230 B2 * | 12/2006 | Glanzer et al. | 700/83 |
| 2006/0136177 A1 * | 6/2006 | Patanian | 702/187 |

OTHER PUBLICATIONS

Leitner, Stefan-Helmut; Mahnke, Wolfgang OPC UA—Service-oriented Architecture for Industrial Applications, Nov. 2006.*

* cited by examiner

*Primary Examiner*—Larry Donaghue
(74) *Attorney, Agent, or Firm*—Bacon & Thomas, PLLC

(57) ABSTRACT

An active monitoring system and method thereof are provided to solve the problems of no real-time monitoring and bandwidth usage in the prior art. A triggering end detects a monitoring device to generate a device tag. The device tag is packed and actively sent to the server end via a network. The server end automatically generates an OPC tag for an integrating server to use. The mechanism can increase monitoring efficiency and bandwidth usage.

14 Claims, 4 Drawing Sheets

ACTIVE MONITORING SYSTEM AND METHOD THEREOF

BACKGROUND OF THE INVENTION

1. Field of Invention

The invention relates to an active monitoring system and the method thereof. In particular, the invention relates to an active monitoring system that can actively transmit a device tag from its triggering end and the method thereof.

2. Related Art

In recent years, the prosperous development in semiconductor-related industry and network technology, the monitoring systems have become more mature and had wider applications. For example, an operator can directly monitor a remote device via the Internet without being in front of it personally. This does not reduce the manpower but also the cost largely.

However, when the above-mentioned monitoring system is to be added with a new device to be monitored, there may be a problem that the new device comes from a different hardware vendor and each device has its own monitoring software. Therefore, it is a problem to make the data exchange interfaces of these devices compatible with each other.

In view of this, hardware and software vendors have proposed the OLE for Process Control (OPC) so that different monitoring software programs and different hardware devices can be connected for data exchanges. However, an OPC monitoring device uses the polling method. It therefore cannot effectively perform real-time monitoring. Moreover, the polling method also produces problems related to bandwidth usage.

In summary, the prior art always has the problems of no real-time monitoring and bandwidth usage. These problems call for an improved technique.

SUMMARY OF THE INVENTION

In view of the foregoing, the invention discloses an active monitoring system and the method thereof.

The disclosed active monitoring system is used in a networking environment with a monitoring device. It includes: a server end and a triggering end. The server end further includes: an initialing module, a message processing module, and a tag module. The initializing module loads in a configuration table during initialization and extracts and records the state of a monitoring device according to the configuration table. The message processing module receives message packets and updates the configuration table accordingly. The tag module uses the updated configuration table to generate and transmit a corresponding OPC tag for an integrating server to process.

The triggering end is connected with the monitoring device. It includes: a command module, a monitoring module, and a processing module. The command module stores control commands and establishes setting parameters according to the control commands. The monitoring module executes the control commands and receives a monitoring signal transmitted from the monitoring device. After receiving the monitoring signal, the monitoring module detects the state of the triggering end. It then generates a device tag according to the state of the triggering end and the setting parameters. The processing module packs the device tag to produce a message packet. After the message packet is produced, it actively transmits the message packet to the server end.

The disclosed active monitoring method applies to a networking environment with a server end, a triggering end, and a monitoring device. The method includes the steps of: linking the triggering end and the monitoring device; loading a configuration table into the server end during initialization and extracting and recording the state of the monitoring device according to the configuration table; establishing setting parameters according to the control commands at the triggering end; executing the control commands and receiving a monitoring signal transmitted from the monitoring device by the triggering end, after receiving the monitoring signal, detecting the state of the triggering end, and generating a device tag according to the state of the triggering end and the setting parameters; packing according to the device tag by the triggering end to generate a message packet and, after the message packet is generated, actively transmitting the message packet to the server end; receiving the message packet by the server end and updating the configuration table according to the message packet; generating and transmitting a corresponding OPC tag by the server end according to the updated configuration table for an integrating server to process.

The disclosed system and method differ from the prior art in that the invention uses the triggering end to detect the monitoring device and generate a device tag. The device tag is then packed and actively transmitted to the server end via the Internet. The server end automatically generates an OPC tag for the integrating server to use.

Using the disclosed technology, the invention can achieve high monitoring efficiency and better bandwidth usage.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before describing the disclosed active monitoring system and the method thereof, the structure of the invention and the terms defined herein are first explained. In the structure, the disclosed system includes a server end, a triggering end, and a network. The server end is an OPC server that can receive a message packet actively transmitted from the triggering end and generate an OPC tag compliant with the OPC standards for data exchanges. The triggering end can be a programmable logic controller that has digital input (DI) and digital output (DO) ports and executes control commands. It is linked to the monitoring device (e.g., network video camera) via the network for transmitting and receiving the monitoring signal, thereby detecting and monitoring the state of the monitoring device. The link between the monitoring device and the DI/DO ports of the triggering end can be done by wires. The network can be wired or wireless Internet or local network.

In the self-defined terms, the control commands referred herein consist of determining condition, valid condition, and invalid condition. They are stored in the triggering end. The control commands may further include those that generate 'Establish Message', 'State Message', 'System Message', 'Active Message', and 'Start Message'. In practice, the control commands can use IF, THEN, and ELSE to represent the determining condition, valid condition, and invalid condition, respectively. Take the state-message-type of commands as an example. If the control command is 'IF (DI-1 ON) THTN (Send Active Message) ELSE (Send E-mail)', then the determining condition is '(DI-1 ON)', the valid condition is '(Send Active Message)', and the invalid condition is '(Send E-mail)'. The control command means that the valid condition '(Send Active Message)' is executed when the determining condition '(DI-1 ON)' holds. Otherwise, the invalid condition '(Send E-mail)' is executed. In particular, the determining condition '(DI-1 ON)' represents that the DI port (DI-1) detects an ON state. The valid condition '(Send Active Message)' represents transmitting a message. The invalid condition '(Send E-mail)' represents sending an E-mail message.

Figure 1:
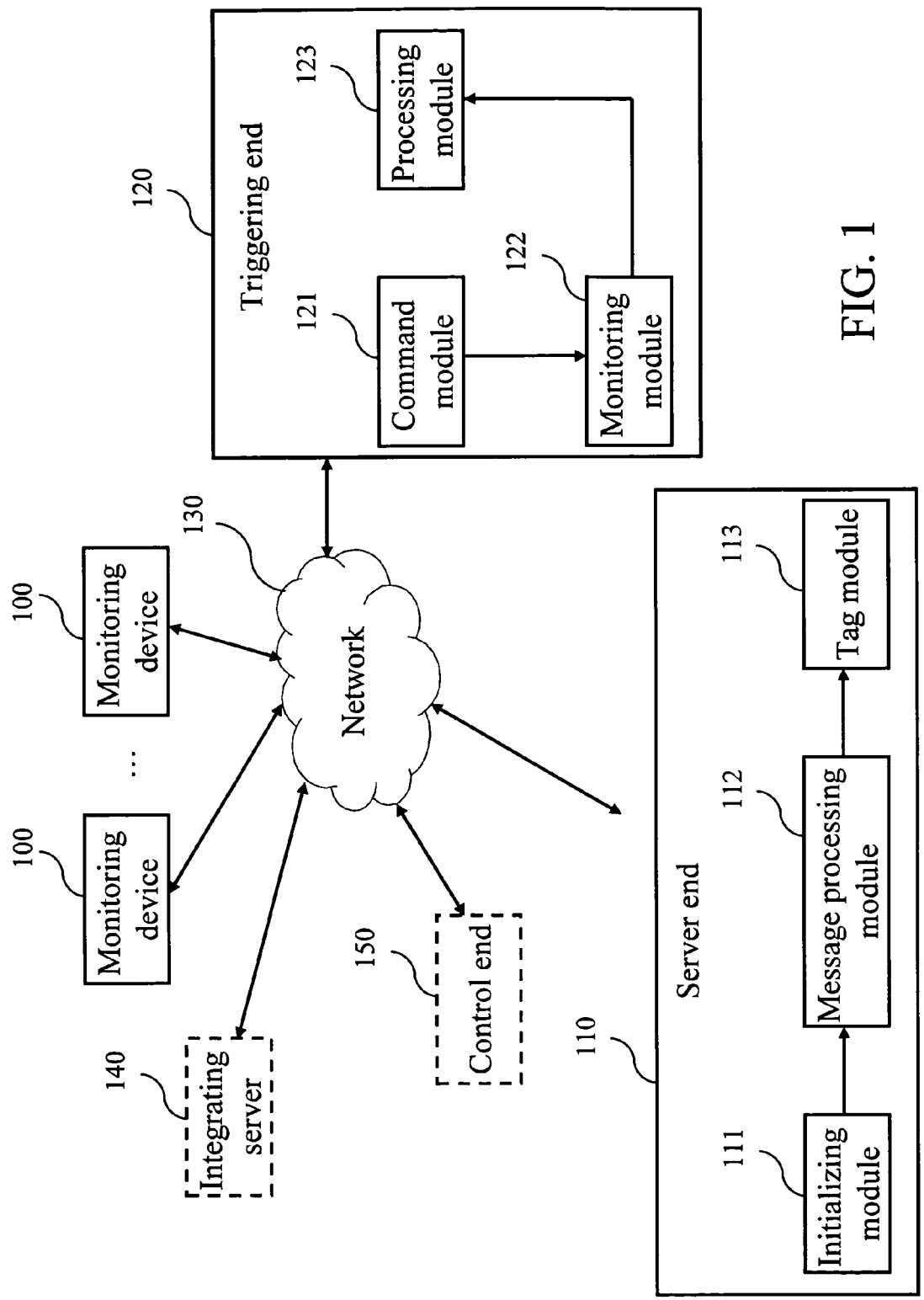
FIG. 1 is a block diagram of the disclosed active monitoring system.

Please refer to FIG. 1 for a block diagram of the disclosed active monitoring system. As shown in the drawing, the active monitoring system according to the invention includes: a monitoring device 100, a server end 110, a triggering end 120, and a network 130. The system further includes at least an integrating server 140 or a control end 150. The monitoring device 100 is an input/output device with the monitoring function, such as a network video camera or an infrared (IR) sensor. It can transmit and receive monitoring signals via the network 130 and the triggering end 120.

The server end 110 includes: an initializing module 111, a message processing module 112, and a tag module 113. The initializing module 111 loads in a configuration table during initialization, and extracts and records the state of the monitoring device 100 according to the configuration table. The configuration table records the triggering end 120 and the corresponding device tag. The device tag includes at least one of device parameter, device type, command type, command subtype, source address, and update time.

The message processing module 112 receives a message packet generated and actively transmitted by the triggering end 120 through the TCP/IP networking protocol. The message processing module 112 also updates the configuration table according to the received message packet. The updating method is done according to the setting parameters of the device tag in the message packet.

The tag module 113 follows the updated configuration table to generate and transmit the corresponding OPC tag for the integrating server 140 to process. The generated OPC tag has to satisfy the public industrial communication standards, which belong to the prior art and are not described herein. The integrating server 140 and the process done by it will be described later.

The triggering end 120 includes: a command module 121, a monitoring module 122, and a processing module 123. It may further include a timer for timing. The command module 121 stores the control commands and establishes setting parameters accordingly. That is, the command module 121 establishes the setting parameters according to the stored control commands. For example, when the type of control command is System Message, a numerical '5' can be used to represent it in an assigned parameter (e.g., nType). The server end 110 can use the numerical recorded in this parameter to determine the message type. Since the control commands referred herein have been described before, they are not repeated here.

The monitoring module 122 executes the control commands and receives the monitoring signal transmitted form the monitoring device 100. After receiving the monitoring signal, it detects the state of the triggering end 120 (e.g., signal state of the DI/DO ports). It then generates a device tag according to the state of the triggering end 120 and the setting parameters. For example, suppose the control command stored in the command module 121 on the triggering end 120 is 'IF (DI-0 ON) THEN (DO-1 ON 1s) ELSE (DO-1 ON 8s)'. The monitoring module 122 executes this control command. After the DI port (DI-0) whose port number is '0' receives an ON monitoring signal, the monitoring module 122 executes the valid condition '(DO-1 ON is)'. That is, the DO port whose port number is '1' is turned on for one second. The monitoring module 122 also detects the signal state of the DI/DO ports of the triggering end 120. A device tag is generated according to the changed DI/DO port states and the setting parameters established for the control command by the command module 121.

As described above, in practice, the device tag can be divided into a message part and a device part. The message part includes a byte to record the device type (e.g., product serial number of the device), another byte to record message type (e.g., numerical '1' for Start Message, '2' for Active Message, '3' for Establish Message, '4' for State Message, and '5' for System Message), two bytes to record the subtype (for advanced application along with the type), four bytes to record an source IP address, six bytes to record the source MAC address of the source medium, nine bytes to record update time (including year, month, day, hour, minute, second, and microsecond), and one byte to record a CRC code.

The processing module 123 packs the device tag to generate a message packet. After the message packet is generated, it is actively transmitted to the server end 110. Since the packaging of network packets is well-known, it is not further described herein.

Besides, the disclosed system further includes an integrating server 140 to receive the OPC tag transmitted from the server end 110 for data exchanges or to make graphical controls. For example, the user can use a graphical interface to control a remote device. Besides, the disclosed system can allow the control end 150 to input a control command and transmit it to the triggering end 120 for storage. Before the transmission, the control end 150 further encodes the control command into a byte code. In practice, the integrating server 140 and the control end 150 can be a computing device such as a personal computer (PC) or a personal digital assistant (PDA) with the function of connecting to the network 130.

Figure 2:
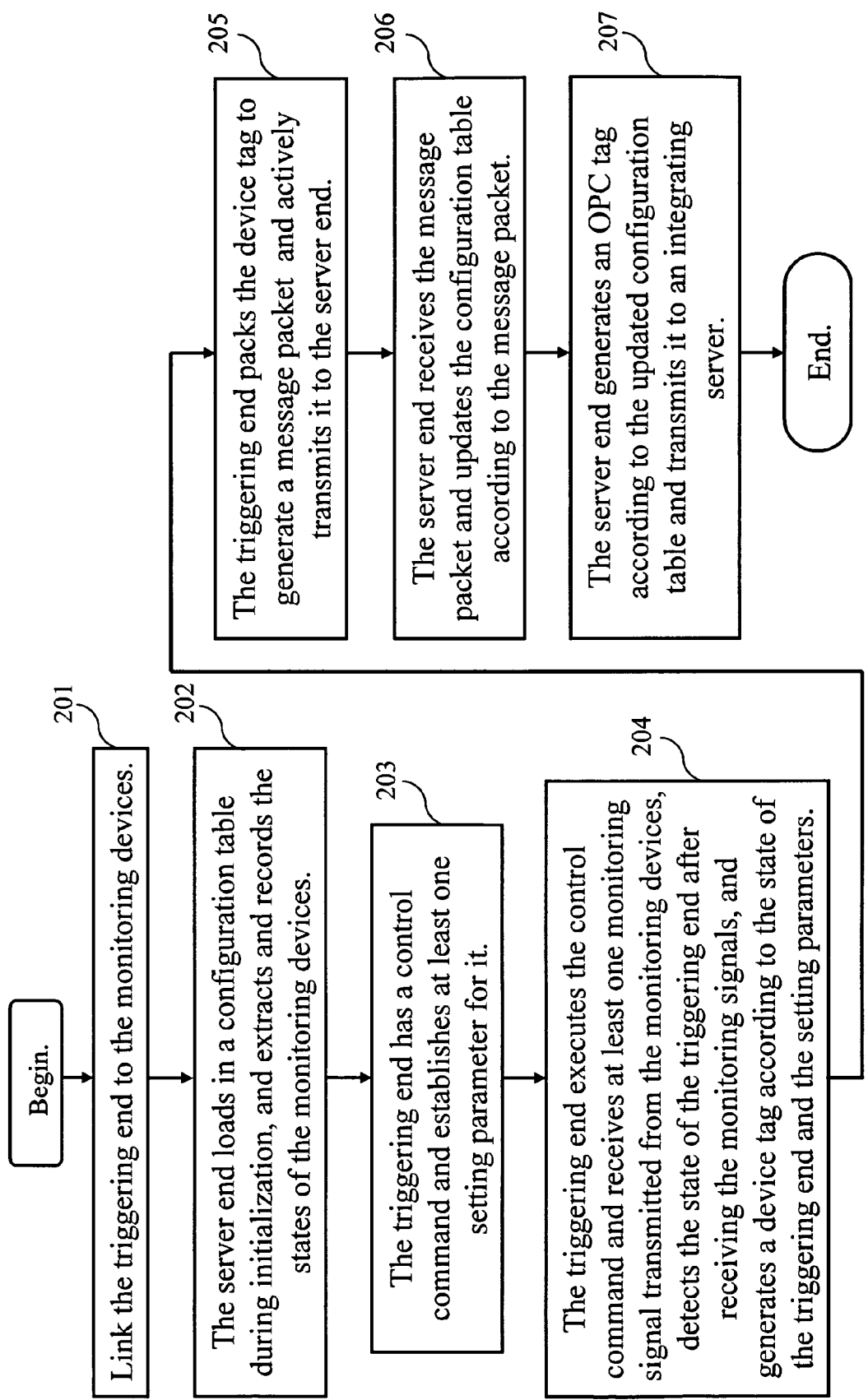
FIG. 2 is a flowchart of the disclosed active monitoring method.

FIG. 2 shows a flowchart of the disclosed active monitoring method. The method includes the following steps. Step 201 links the triggering end and the monitoring device. In step 202, the server end loads in the configuration table during initialization. The triggering end has control commands and establishes setting parameters for the control commands in step 203. In step 204, the state of the triggering end is detected and a device tag is generated according to the state of the triggering end and the setting parameters. In step 205, the triggering end packs the device tag to generate a message packet and actively transmit the message packet to the server end. In step 206, the server end receives the message packet and updates the configuration table accordingly. In step 207, the server end generates and transmits an OPC tag according to the updated configuration table for the integrating server to process. Through the above-mentioned steps, the triggering end detects the monitoring device and generates the device tag. The device tag is then packed and actively transmitted to the server end via the network. The server end automatically generates the OPC tag for the integrating server to use. The invention is then able to promote its monitoring efficiency and bandwidth usage.

Figure 3:
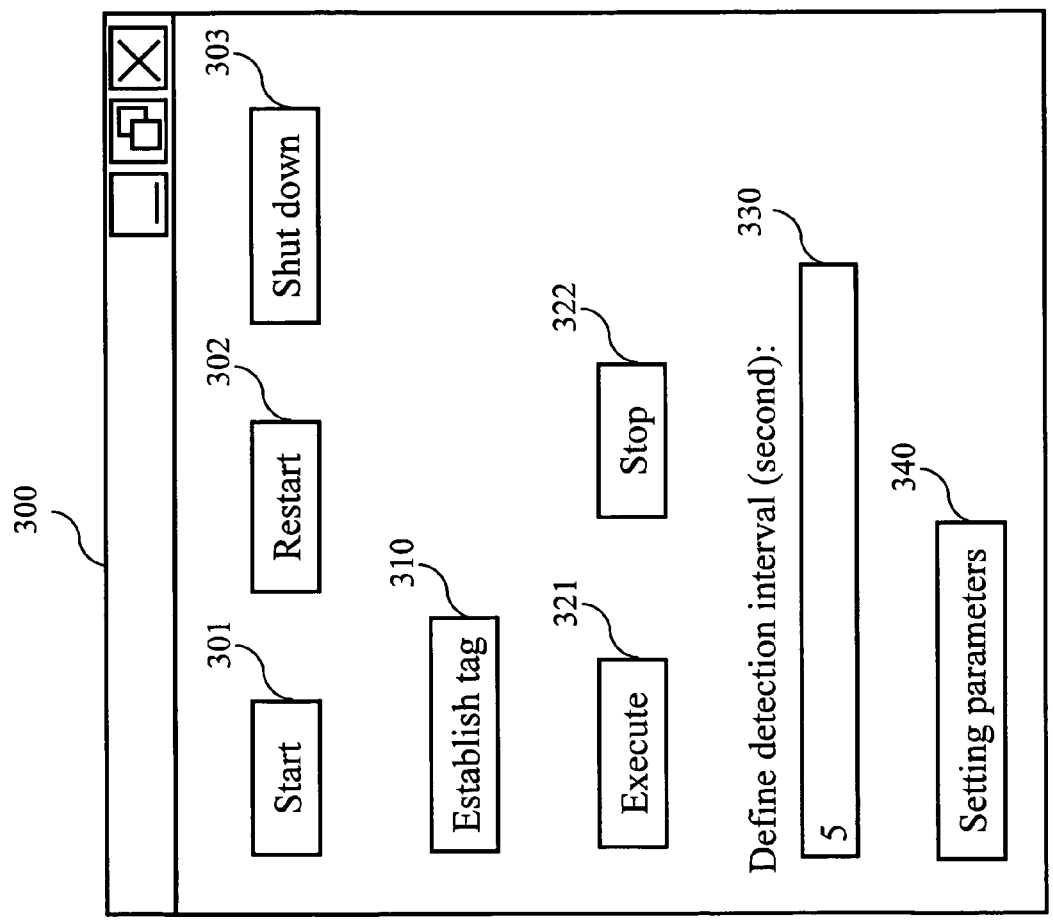
FIG. 3 is a schematic view of setting the triggering end according to the invention.
Figure 4:
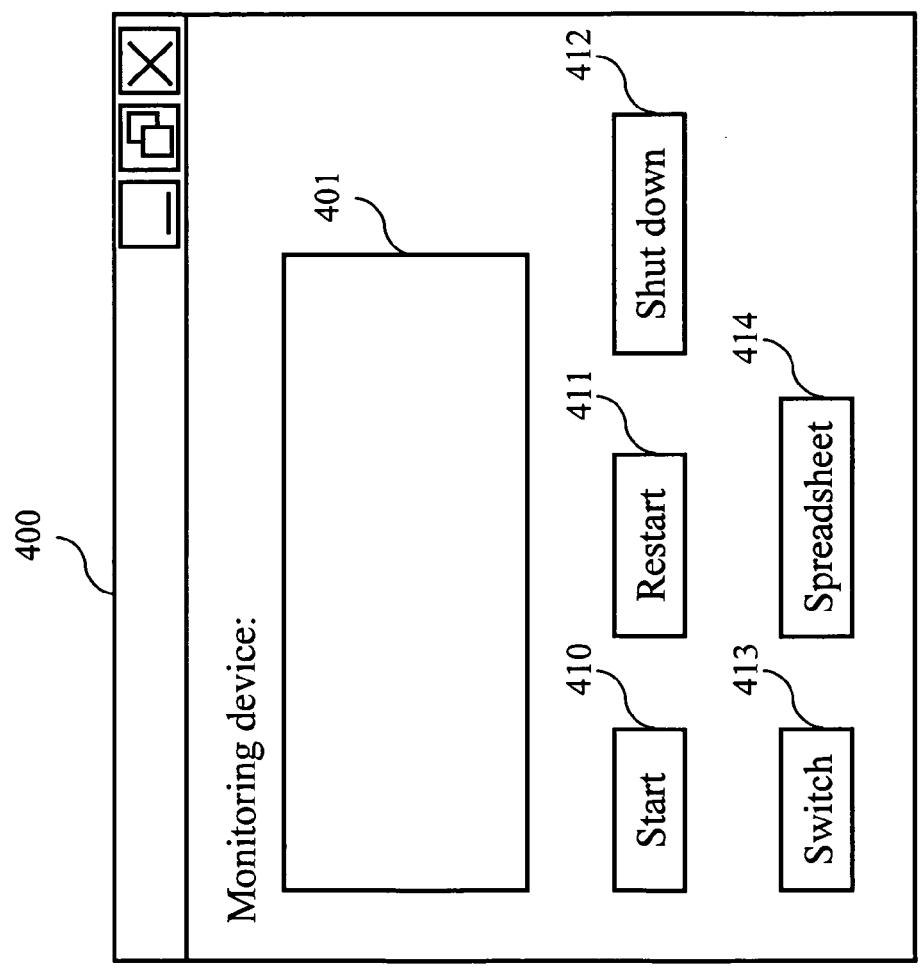
FIG. 4 is a schematic view of performing graphical control according to the invention.

Please refer to FIGS. 3 and 4 for an embodiment of the invention. FIG. 3 is a schematic view showing how to set the triggering end according to the invention. It includes a device setting window 300, a starting element 301, a restarting element 302, a shutdown element 303, a tag establishing element 310, an executing element 321, a stopping element 322, a time entering block 330, and a parameter setting element 340. It should be mentioned that the invention does not limit the type and number of elements included in the device setting window 300.

First, when the user wants to use the disclosed active monitoring system, the monitoring device 100 and the network 130 have to maintain their normal operations in addition to turning on the server end 110 and the triggering end 120. Moreover, the triggering end 120 must have stored predetermined control commands.

When the server end 110 starts, the initializing module 111 thereof loads in the configuration table. The configuration table records information (i.e., device tag) related to the triggering end 120. The server end 110 then extracts and records the states of all the monitoring devices 100 by polling. The message processing module 112 waits to receive the message packet generated by the triggering end and actively transmitted via the TCP/IP standards. In practice, the server end 110 can turn on a listen port for receiving the message packet transmitted from the triggering end 120. It should be particularly mentioned that when no relevant information of the triggering end 120 is found in the configuration table, the listen port can be directly turned on for receiving the message packet transmitted from the triggering end 120. In practice, the configuration table can exist in a file, e.g., 'OPC.mdb'.

When the triggering end 120 starts or restarts, it establishes setting parameters according to the control commands stored in the command module 121. For example, when the stored control command is of the type of the Status Message, the corresponding setting parameter is established. The product serial number of the device is stored in an assigned parameter with the name of nModuleType. A numerical '4' is stored in the assigned parameter nType. It should be noted that when the triggering end 120 starts or restarts, the monitoring module 122 can directly generate a device tag according to the predetermined setting parameters. The processing module 123 then packs the device tag to generate a message packet. After its generation, the message packet is actively transmitted to the server end 110. After the server end 110 receives the message packet, the device tag therein is used to extract and record the state of the DI/DO ports of the triggering end 120. Up to this point, the server end 110 and the triggering end 120 complete the starting procedure and operate in their normal running state.

Suppose the monitoring device 100 detects an environmental change and transmits a monitoring signal. For example, the DI-0 port with the port number 0 is changed from OFF to ON. In addition to receiving such a monitoring signal, the monitoring module 122 of the triggering end 120 further executes a control command, such as 'IF (DI-0 ON) THEN (DO-1 ON 1s) ELSE (DO-1 ON 8s)' to perform a corresponding process. In this example, the corresponding process is to turn on the DO-1 port with the port number 1 by one second. It further detects the states of the DI/DO ports of the triggering end 120. A device tag is generated according to the setting parameters of the control command. Afterwards, the processing module 123 packs the generated device tag and produces a message packet to be transmitted over an Ethernet. The packet is actively transmitted to the server end 110 via the network 130.

As described above, after the message processing module 112 of the server end 110 receives the message packet, it updates the configuration table according to the device tag therein. In this example, the updated configuration table records the states of the DI/DO ports of the triggering end 120. It keeps the records that the DI-0 port is ON for one second and the DO-1 port is ON for one second as well. Afterwards, the tag module 113 generates a corresponding OPC tag according to the updated configuration table. The OPC tag is compliant with the public industrial communication standards (i.e., OLE for Process Control). It enables the integrating server 140 to perform graphical data exchanges. Up to now, the triggering end 120 has completed the process of actively transmitting the message packet to the server end 110. As a result, the server end 110 does not need to continuously poll all the monitoring devices 100. This enhances bandwidth usage. Since the triggering end 120 actively transmits the message packet when there is a state change, the monitoring efficiency is increased for real-time monitoring. The part of the integrating server 140 performing graphical data exchanges will be detailed later.

In addition, the disclosed active monitoring system can further include a control end 150 for inputting and transmitting a control command via the network 130. Moreover, the triggering end 120 can be controlled and set via the device setting window 300. For example, the user can start, restart or shut down the triggering end 120 by clicking the starting element 301, the restarting element 302 or the shutdown element 303, respectively. Since the process of starting or restarting the triggering end 120 has been described before, it is not repeated here.

When the user clicks the tag establishing element 310, the triggering end 120 transmits a predetermined message packet (including information related to the triggering end 120 and the parameter 'nType' in the device tag being '3') to the server end 110. In this case, the server end 110 obtains the value '3' for the parameter 'nType' from the device tag in the message packet. It then checks whether there is any information related to the triggering end 120 in the configuration table. If not, the information related to the triggering end 120 is added to the configuration table. Otherwise, the device tag in the message packet is used to update the information of the triggering end 120 in the configuration table.

When the user clicks the executing element 321 or the stopping element 322, the triggering end 120 transmits a default message packet to the server end 110. Suppose the user clicks the executing element 321. Its default message packet includes information related to the triggering end 120 的. Moreover, in the device tag, the parameter 'nType' s set as '5' and the parameter 'nSubType' is set as '1'. In this case, the server end 110 learns from the device tag in the message packet that the parameter 'nType' has value '5' and the parameter 'nSubType' has value '1'. Consequently, the server end 110 follows the value of the parameter 'nSubType' to set the access privilege of the configuration table (e.g., value '1' means readable/writeable, and value '2' means read-only). In other words, when the user clicks the executing element 321 or the stopping element 322, the triggering end 120 transmits the corresponding message packet to the server end 110, making the configuration table therein readable/writeable or read-only. Of course, if the configuration table is read-only, the server end 110 cannot update the configuration table according to the message packet transmitted from the triggering end 120. Nor does it generate a corresponding OPC tag for the integrating server 140 to perform data exchanges.

Besides, the triggering end 120 can continuously generate the device tag according to predetermined setting parameters at a fixed time interval. The time interval can be set via a device setting window 300 of the control end 150. For example, the user sets the number of seconds in the interval through a time entering field 330 (e.g., number '5' means 5 seconds). After this value is stored in the triggering end 120, it continuously generates the device tag according to the predetermined parameters at the fixed time interval (e.g., 5 seconds). The subsequent process after generating the device tag is the same as starting or restarting. It is thus not repeated here again.

As mentioned before, the setting parameters can be stored in advance in the triggering end 120. In practice, one can use a parameter setting element 340 to establish setting parameters. For example, after the user clicks the parameter setting element 340, a setting window (not shown) is generated for the user to set device parameter, device type, command type, command subtype, source address, update time, etc.

FIG. 4 is a schematic view of graphical control according to the invention. As mentioned before, the disclosed active monitoring system can further include an integrating server 140. After the server end 110 generates the OPC tag compliant with the public industrial communication standard, the integrating server 140 then follows the OPC tag to perform the corresponding data exchanges. For the graphical control in practice, the integrating server 140 is Supervisor Control And Data Acquisition (SCADA). A graphical control window 400 is used for graphical control. For example, the message in the OPC tag is analyzed and processed. The result is then displayed in a device displaying field 401. The user may even switch the monitoring device 100 via a switching element 413. The user can use the start element 410, restart element 411 or the shutdown element 412 to start, restart, or shut down the selected monitoring device 100 in a remote monitoring way. Moreover, the user can click a spreadsheet element 414 to generate a spreadsheet with at least text, plots, or tables according to the OPC tag.

In summary, the invention differs from the prior art in that the triggering end detects the monitoring device and generates a device tag. The device tag is packed and actively transmitted via the network to the server end. The server end then automatically generates the OPC tag for the integrating server to use. This technique can actively transmit the state of the monitoring device to the server end, solving problems existing in the prior art. The invention thus achieves the goal of enhancing monitoring efficiency and bandwidth usage.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An active monitoring system used in a network environment with at least one monitoring device, the system comprising:
    a server end, which includes:
        an initializing module, which loads in a configuration table during initialization and extracts and records the states of the monitoring devices;
        a message processing module, which receives a message packet and updates the configuration table according to the message packet; and
        a tag module, which generates an OPC tag according to the updated configuration table and transmits it to an integrating server for further processing; and
    a triggering end, which links to the monitoring devices and includes:
        a command module, which stores a control command and establishes at least one setting parameter for the control command;
        a monitoring module, which executes the control command and receives at least one monitoring signal transmitted from the monitoring devices, detects the state of the triggering end after receiving the monitoring signal, and generates a device tag according to the state of the triggering end and the setting parameters; and
        a processing module, which packs the device tag to generate the message packet and then actively transmits the message packet to the server end.

2. The active monitoring system of claim 1 further comprising a control end for entering and transmitting the control command.

3. The active monitoring system of claim 1, wherein the integrating server receives the OPC tag transmitted from the server end for performing data exchanges or graphical control.

4. The active monitoring system of claim 1, wherein the control command includes the command types of Establish Message, State Message, System Message, Active Message, and Start Message.

5. The active monitoring system of claim 1, wherein the configuration table records the triggering end and the corresponding device tag.

6. The active monitoring system of claim 1, wherein the device tag includes at least one of device parameter, device type, command type, command subtype, source address, and update time.

7. The active monitoring system of claim 2, wherein the control end further encodes the control command into a byte code.

8. An active monitoring method used in a network environment with a server end, a triggering end, and at least one monitoring device, the method comprising the steps of:
    linking the triggering end to the monitoring devices;
    loading a configuration table into the server end during initialization and extracting and recording the states of the monitoring devices according to the configuration table;
    associating a control command with the triggering end and establishing at least one setting parameter for the control command;
    executing the control command by the triggering end and receiving at least one monitoring signal transmitted from the monitoring devices, detecting the state of the triggering end after receiving the monitoring signals, and generating a device tag according to the state of the triggering end and the setting parameters;
    packing the device tag by the triggering end to generate a message packet and actively transmitting the message to the server end;
    updating the configuration table according to the message packet after it is received by the server end; and
    generating an OPC tag according to the updated configuration table by the server end and transmitting it to an integrating server for processing.

9. The active monitoring method of claim 8, wherein the control command is entered and transmitted via a control end and stored in the triggering end.

10. The active monitoring method of claim 8, wherein the integrating server receives the OPC tag transmitted from the server end for performing data exchanges or graphical control.

11. The active monitoring method of claim 8, wherein the control command includes the command types of Establish Message, State Message, System Message, Active Message, and Start Message.

12. The active monitoring method of claim 8, wherein the configuration table records the triggering end and the corresponding device tag.

13. The active monitoring method of claim 8, wherein the device tag includes at least one of device parameter, device type, command type, command subtype, source address, and update time.

14. The active monitoring method of claim 9, wherein the control end further encodes the control command into a byte code.

* * * * *